United States Patent
Kubba

(10) Patent No.: US 10,645,018 B2
(45) Date of Patent: May 5, 2020

(54) CONGESTION BASED THROTTLING IN SATELLITE BASED NETWORKS

(71) Applicant: Rajeev Kubba, Clarksville, MD (US)

(72) Inventor: Rajeev Kubba, Clarksville, MD (US)

(73) Assignee: Hughes Network Systems, LLC, Germantown, MD (US)

(*) Notice: Subject to any disclaimer, the term of this patent is extended or adjusted under 35 U.S.C. 154(b) by 95 days.

(21) Appl. No.: 16/055,288

(22) Filed: Aug. 6, 2018

(65) Prior Publication Data

US 2020/0044979 A1 Feb. 6, 2020

(51) Int. Cl.
| | | |
|---|---|---|
| *H04L 12/873* | (2013.01) | |
| *H04L 12/801* | (2013.01) | |
| *H04W 72/08* | (2009.01) | |
| *H04L 12/825* | (2013.01) | |
| *H04W 28/02* | (2009.01) | |
| *H04W 72/04* | (2009.01) | |
| *H04W 28/22* | (2009.01) | |
| *H04W 28/08* | (2009.01) | |

(52) U.S. Cl.
CPC ............ *H04L 47/522* (2013.01); *H04L 47/14* (2013.01); *H04L 47/25* (2013.01); *H04W 28/0236* (2013.01); *H04W 28/0268* (2013.01); *H04W 28/085* (2013.01); *H04W 28/22* (2013.01); *H04W 72/0486* (2013.01); *H04W 72/0493* (2013.01); *H04W 72/085* (2013.01)

(58) Field of Classification Search
CPC ....... H04L 47/522; H04L 47/14; H04L 47/25; H04W 28/0236; H04W 28/0268; H04W 28/085
See application file for complete search history.

(56) References Cited

U.S. PATENT DOCUMENTS

| | | | |
|---|---|---|---|
| 2005/0163048 A1* | 7/2005 | Arora | H04L 47/10 370/230 |
| 2013/0223222 A1* | 8/2013 | Kotecha | H04L 43/0882 370/235 |
| 2017/0048390 A1 | 2/2017 | Bhatia et al. | |

FOREIGN PATENT DOCUMENTS

EP 1553740 A1 7/2005

OTHER PUBLICATIONS

International search report for application No. PCT/US2019/045038.

* cited by examiner

*Primary Examiner* — Siming Liu
(74) *Attorney, Agent, or Firm* — Capitol City TechLaw; Jasbir Singh

(57) ABSTRACT

A system and method for reducing waste of a network resource is disclosed. The method including: providing a group of active subscribers; determining an underutilization level of the network resource for an upcoming allocation interval; calculating a throttle and a resource weight for the group of active subscribers to decrease the underutilization level; allocating the network resource based on the throttle and the resource weight; and adjusting, based on a feedback underutilization level, the throttle and the resource weight. In some embodiments, the throttle is based on congestion metrics including measuring available channel capacity, a latency, a queue depth, a count of subscribers in an outroute channel or the like. In some embodiments, the active subscribers may include under subscribers, over subscribers and premium subscribers, wherein each of the over subscribers have exceeded a respective network resource usage allowance for a respective subscription interval.

20 Claims, 4 Drawing Sheets

CONGESTION BASED THROTTLING IN SATELLITE BASED NETWORKS

FIELD

A system and method to monitor free bandwidth available in a satellite-based network and dynamically distribute the free bandwidth to subscribers without degrading the satellite-based network's overall performance is disclosed.

BACKGROUND

For a business providing network access, any unused bandwidth in the network is lost to time and cannot be leveraged to the advantage of the business. As such, the business may monitor free bandwidth available in the network, for example, a satellite-based network, and distribute the free bandwidth to its subscribers without degrading the network's overall performance.

Current methods of throttling a throughput speed for a subscriber's connections are based on a data usage limit paid for by the subscriber and any pending or remaining allowances from the data usage limit in a billing period. The subscribers are throttled based on their usage and the system fails to take advantage of available free bandwidth in the system. Increasing a throughput speed for the subscribers who have exceeded their data allowance across the system uniformly causes overload during peak hours and causes degraded speeds to those subscribers who have not exceeded their allowance limit.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a congestion based throttling method for reducing waste of a network resource is disclosed. The method includes: providing a group of active subscribers; determining an underutilization level of the network resource for an upcoming allocation interval; calculating a throttle and a resource weight for the group of active subscribers to decrease the underutilization level; allocating the network resource based on the throttle and the resource weight; and adjusting, based on a feedback underutilization level, the throttle and the resource weight.

The present teachings disclose a congestion based throttling system to reduce waste of a network resource. The system includes: a group of active subscribers; a utilization determiner to determine an underutilization level of the network resource for an upcoming allocation interval; an allocation calculator to calculate a throttle and a resource weight for the group of active subscribers to decrease the underutilization level; a resource allocator to allocate the network resource based on the throttle and the resource weight; and a throttle set to adjust, based on a feedback underutilization level, the throttle and the resource weight.

Additional features will be set forth in the description that follows, and in part will be apparent from the description, or may be learned by practice of what is described.

DRAWINGS

In order to describe the way, the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail using the accompanying drawings.

Figure 6:
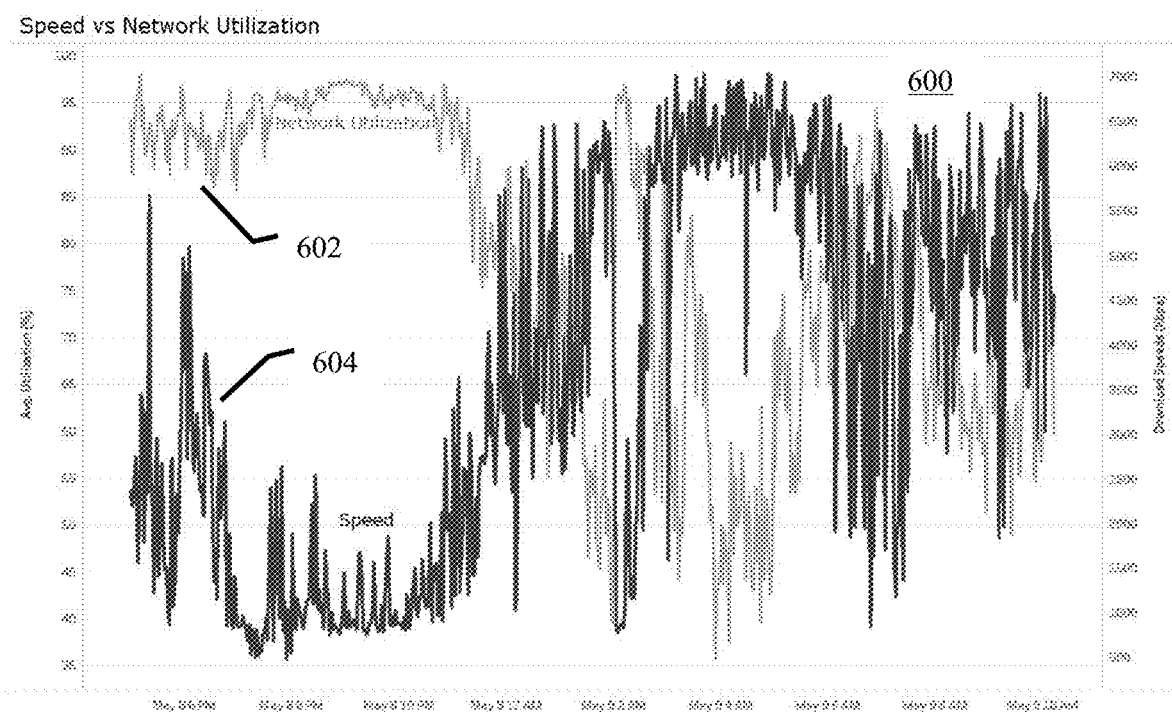

FIG. 6 illustrates measured speed improvements for bandwidth of a network during underutilized or uncongested periods for subscribers according to various embodiments, Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced item. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings disclose a system and method for Congestion based Throttling (CBT) to increase utilization of available capacity of a network, for example, during non-peak hours. CBT satisfies bandwidth management requirements by combining network status and bandwidth usage to dynamically improve network utilization or efficiency by adjusting a data service to, for example, an end user, a network connection, a subscriber, an entity utilizing a portion of a channel, or the like.

Giving higher speeds to active subscribers, for example, to throttled and non-throttled subscribers, when free bandwidth is available in the system, increases overall customer satisfaction. The present teachings use continuous monitoring of a system's capacity and current usage pattern (bandwidth, number of subscribers etc.) in each apportionable resource, such as, a gateway, a beam, a frequency band, a channel, or a combination thereof, to determine current conditions within the system. Based on the current conditions detected, a speed control module may be dynamically applied. Speed settings may be determined by the speed control module based on historical congestion levels. Speed settings may be fine-tuned at different resources or levels, for example, a beam, a channel, an outroute, an inroute, a frequency band, or the like. Historical congestion levels may be recorded in different geographical locations. The historical congestion levels may be recorded per each of the different geographical locations. The historical congestion levels may include levels for a relevant duration, for example, congestion levels for a day of the week, for a specific period/interval during the day (office hours, evening hours, morning hours, etc.) or the like.

Throttling bandwidths provided to subscribers based on an associated QoS service contract while multiplexing the bandwidth and other resources in a network is a challenge. The network may include non-terrestrial networks, for example, a relay network, a bent-leg network, a satellite network, a cellular network, or the like. In exemplary embodiments, the network may provide an internet service. The present teachings disclose features and advantages for the network system including, but not limited to:

- Reduction of wasted network resources during a non-congested interval by providing more bandwidth to all active subscribers, including the subscribers that have exceeded their data allowance. In some embodiments, the network may prefer providing bandwidth to a subscriber with a positive data allowance credit.
- Dynamic application of weighted speed throttling to the subscriber who has exceeded their data allowance during a congested interval.
- Adaptive speed threshold settings for a subscriber based on machine learning from the system's past behavior and current traffic conditions.
- Incentivizes a subscriber to use the system during uncongested intervals to get better throughput and at times a greater data allowance.
- Dynamically applies speed throttling to a subscriber who has exceeded their data allowance during a traffic congestion interval.
- Increases subscriber satisfaction factor, thereby reducing subscriber churn.

The present teachings utilize a full capacity of a channel and fairly distribute available bandwidth to the active subscribers during all times of the day. This may reduce wastage of network resources during a non-congested interval by providing more bandwidth to all active subscribers with preference to a subscriber who has a positive data allowance credit. In some embodiments, the present teachings provide dynamically applied weighted speed throttling, when there is traffic congestion, to the subscriber who has exceeded their data allowance. In some embodiments, the present teachings provide adaptive speed threshold settings for a subscriber based on machine learning from the past behavior of the system and current traffic conditions tracked at different geographic areas, and adjusted for the behavior of the geographically local portion of the network.

Exemplary Embodiment

Figure 1:
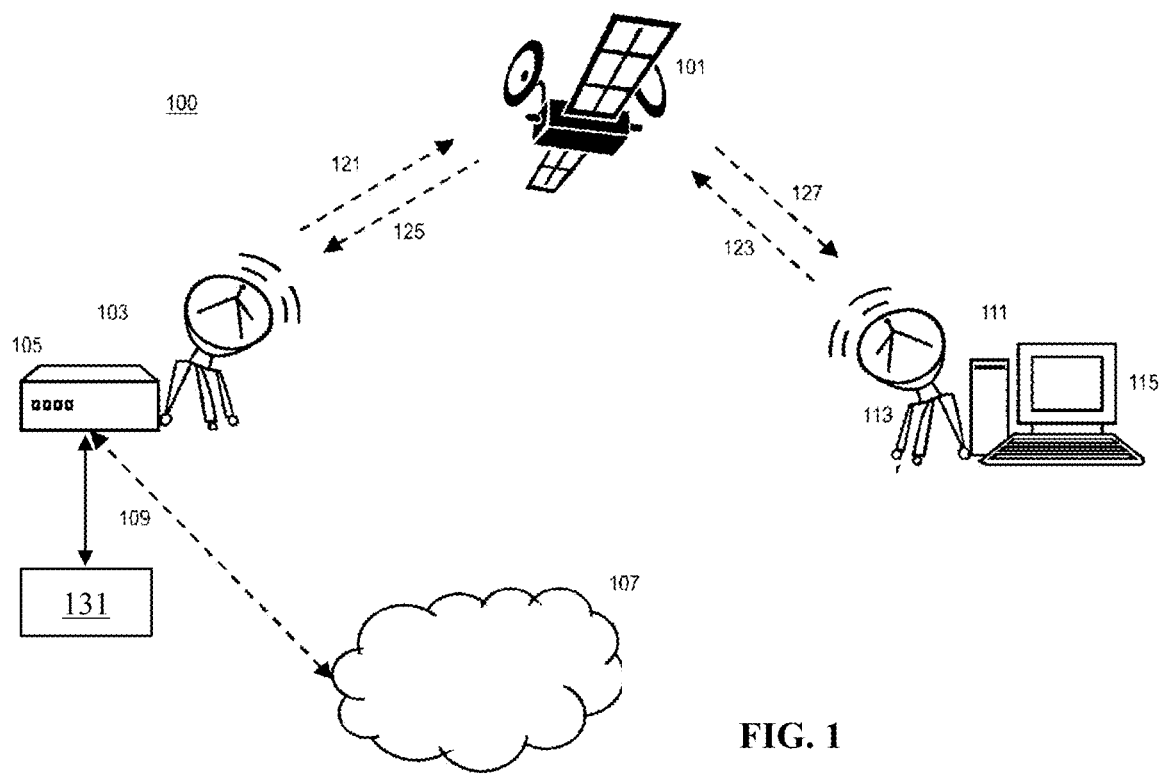
FIG. 1 illustrates a radio communication system or exemplary operating environment according to various embodiments.

FIG. 1 illustrates a radio communication system or exemplary operating environment according to various embodiments.

An exemplary system 100 may include at least one satellite 101 (or a High-Altitude Platform (HAP)) and a Radio Frequency Gateway (RFGW) 103 connected via a data switching element 105 to a network 107. The connection 109 between the server and a data switching element 105 to the network 107 may be wired, wireless, or a combination thereof. The network 107 includes one or more wired/data networks (for example, LAN, MAN, WAN, the internet, and the like.).

The system 100 may utilize a frequency and/or time multiplexed radio link to provide communications.

The system 100 may include a subscriber system 111. The subscriber system 111 may connect to a Very Small Aperture Terminal (VSAT) 113 and a subscriber terminal 115. The subscribers may be individuals, business entities, governmental agencies, or the like. The subscriber terminal 115 may include access points configured to communicate with other subscriber terminals in the network 107 using, for example, radio frequency (RF), Bluetooth (BT), infrared (IrDA) or any of several different wireless networking techniques, including WLAN techniques. The subscriber terminal 115 may be disposed indoors, while the VSAT 113 including a radio may be disposed outdoors.

The VSAT 113 may be utilized at a location for communicating via the satellite 101 to the RFGW 103. The RFGW 103 communicates with multiple VSATs, via radio signals or beams known as Code Rate Organizers (CROs). A CRO is component that, for example, manages modulation and coding for an outroute or an inroute. The communication satellite 101 receives an uplink signal 121 from the RFGW 103 and an uplink signal 123 from the VSAT 113. The communication satellite 101 transmits a downlink signal 125 to the RFGW 103 and a downlink signal 127 to the VSAT 113. The RFGW 103 sends communication signals to the VSAT 113 via a forward link including the uplink signal 121 and the downlink signal 127. The VSAT 113 sends communications signals to the RFGW 103 via the return link including the uplink signal 123 and the downlink signal 125. In exemplary embodiments, the communication satellite 101 receives signals at a first frequency and transmits signals at a second frequency different from the first frequency.

In some embodiments, no relays or multiple relays (for example, the satellite 101, a High-Altitude Platform (HAP), or the like) may be used to communicate between the VSAT 113 and the RFGW 103.

The system 100 may be a Multi-RFGW Multi-CRO system providing flow control and bandwidth management in the one or both Outroute and Inroute directions. There may be X beams and Y RFGWs where X and Y are greater than one (1), forming an X-by-Y model. X CROs may be in multiple beams of one or multiple satellites. Y RFGWs may be at one or multiple ground locations. Such an X-by-Y system may be fully or partially interconnected, i.e., all X CROs may or may not be connected to all Y RFGWs, and vice versa. In some embodiments, the RFGWs may not be collocated. In some embodiments, the CROs may be servicing different Data Switching network elements, such as, RFGWs, satellites, wireless access channels or wireline access channels.

The system 100 may include a Flow Control (FC) module 131 providing bandwidth allocation, flow control (e.g., scheduling and TCP congestion control), congestion statistics, and administrative coordination (e.g., association) on the CROs. In some embodiments, the FC 131 may be a centralized bandwidth management and reallocation scheme performed by a Bandwidth Manager (BM) to avoid overallotment and balance bandwidth allocation on the CROs, RFGWs 103 and the data switching element 105. In some embodiments, the flow control module 131 may be a distributed bandwidth management and reallocation scheme. The FC 131 may include a CBT system.

The present teachings utilize traffic measurement for each frequency channel from a RFGW and/or a Data Switching network element. Based on the traffic measurement, the FC may dynamically adjust bandwidth throttling of the subscribers who have exceeded their data allowance during traffic congestion periods, while giving preference to subscribers who have positive credits. These dynamic throttling controls may be done for a geographic region of a network, independent of traffic conditions at other geographic areas in the network. In some embodiments, the network adjusts the dynamic throttling at a configurable interval, for example, every 30 seconds, every 60 seconds, every 5 minutes, every 15 minutes, or the like. Making changes too frequently to the adjusting interval may cause the network to start oscillating and making changes too slowly to the adjusting interval may allow congestion in the network to persist for longer than necessary. In some embodiments, the adjusting interval is configurable.

In exemplary embodiments, traffic measurements may include bits per second usage (amount), percentage of available bandwidth or symbol rate used per second, latency, queue depths, number of users, available channel capacity, the like, or a combination thereof. In exemplary embodiments, a network resource may have a limited throughput for bandwidth. The bandwidth may be based on limitation of a physical media or a data switching network element, for example, a symbol rate, a size of the frequency band, a symbol rate, an error correction rate, a maximum encoding or coding rate, or the like.

The dynamic determination of network bandwidth multiplex settings may be fine-tuned at different network node levels based on historical congestion recorded in different geographical locations. Exemplary network resources for a satellite-based network include a gateway, a beam, a channel, a satellite, an inroute, an outroute, a CRO, a RFGW or the like. In some embodiments, an RFGW may include a satellite gateway, a cellular base station, or the like.

Figure 2A:
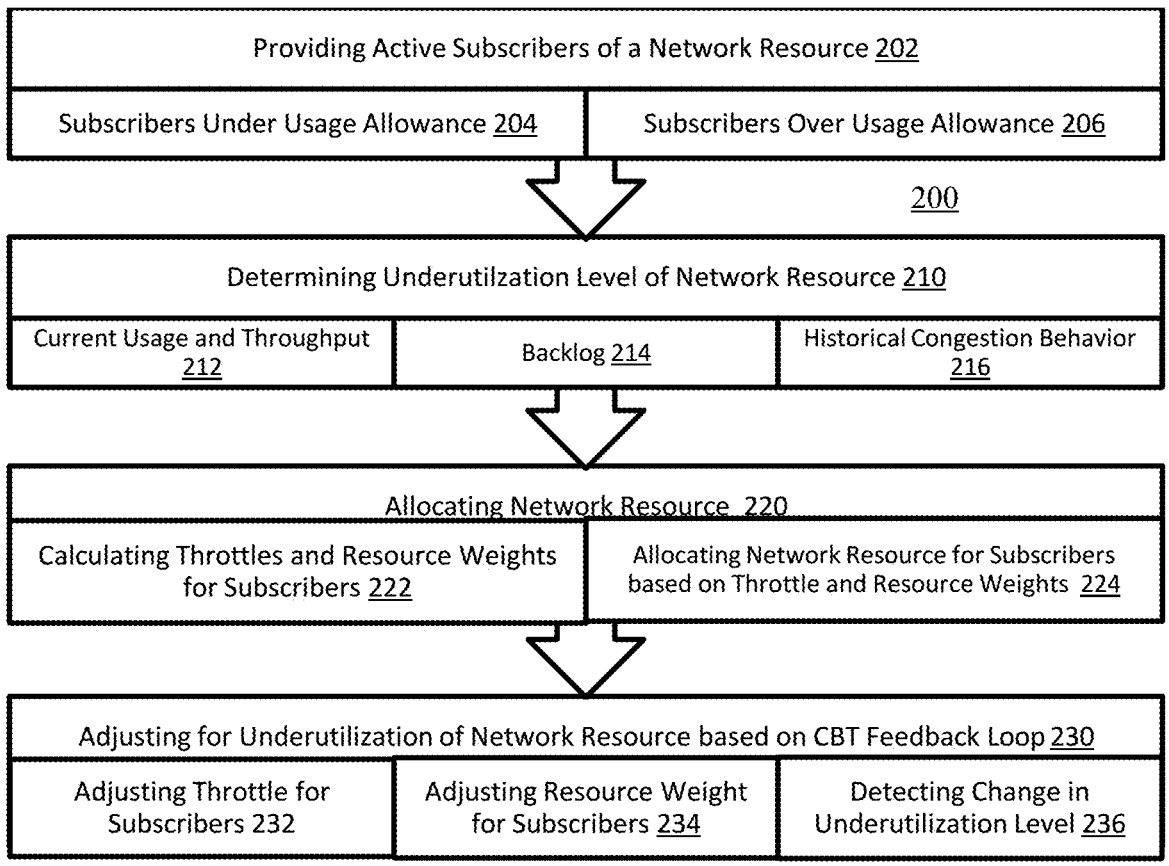
FIG. 2A illustrates an exemplary method for providing enhanced throughput and Quality of Service (QoS) by reducing waste of a network resource according to various embodiments.

FIG. 2A illustrates an exemplary method for providing enhanced throughput and Quality of Service (QoS) by reducing waste of a network resource according to various embodiments.

A method 200 for reducing waste of a network resource may include an operation 202 for providing a group of active subscribers of a network resource. The group may be a table, a list, a database table, a data structure, or the like. The operation 202 may include an operation 204 for providing a group of active subscribers that are under or have not exceeded a usage allowance for the network resource for a subscription interval. The under-usage subscriber group may include subscribers of various subscription types, for example, premium subscribers, unlimited usage subscribers, unthrottled subscribers, throttled subscribers, or the like.

The operation 202 may include an operation 206 for providing a group of active subscribers that are over or have exceeded a usage allowance for the network resource for a subscription interval. Generally, the subscription type of these subscribers may be throttled subscribers, subscribers having a usage allowance for a subscription period or the like.

Figure 3:
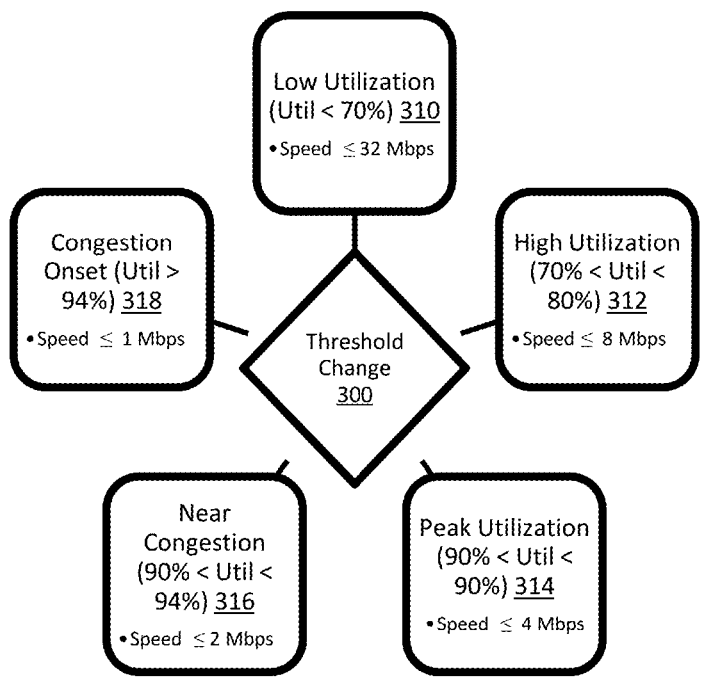
FIG. 3 illustrates a dynamic adjustment control transition diagram according to various embodiments.

The subscribers in operation 204 and 205 may be grouped in various manner. In some embodiments, the subscribers may be grouped as one group by the CBT and handled the same regardless of each subscriber's subscription type. In some embodiments, the subscribers may be differentiated by the subscription type using a data structure known in the art, for example, a profile group, a subscription level, subgrouping by subscription type, associating a subscription plan with the subscriber, or the like. The CBT may apply a different dynamic adjustment control based on the subscription type of the group or subscriber. An exemplary dynamic adjustment control is illustrated in FIG. 3.

The method 200 may include an operation 210 for determining an underutilization level of the network resource. The underutilization level may indicate how much of a network resource will be unused or unconsumed in an upcoming allocation interval or period; in other words, how congested or uncongested the network resource will be in the upcoming allocation interval. The underutilization level may be expressed as a rate, a percentage, a stepping ladder, or the like. The upcoming allocation interval may be an immediate next allocation interval. In some embodiments, the upcoming allocation interval may be selected to avoid churning or rapid changes in an underutilization level. In some embodiments, the upcoming allocation interval may be configurable and may set as a large multiple of a bandwidth allocation interval. For example, for a bandwidth allocation interval of 300 millisecond (ms), the upcoming allocation interval may be set as 1 minute, 2 minutes, 5 minutes, 15 minutes, or the like.

Operation 210 may include an operation 212 for receiving, calculating, measuring, or determining a current usage and throughput of the network resource. Operation 210 may include an operation 214 for receiving, calculating, measuring, or determining a backlog of unfulfilled bandwidth allocation requests. Operation 210 may include an operation 216 for receiving, calculating, measuring, or determining a historical congestion behavior of the network resource.

The method 200 may include an operation 220 for allocating the network resource in view of the adjusting operation 230. Operation 220 may include an operation 222 for calculating a resource weight associated with a subscriber based on the throttle. In some embodiments, the calculating of a resource rate or a throttle may be at a group level for the active subscribers. The groupings for the active subscribers may be by a subscription parameter associated with the active subscriber, for example, a subscription type and a subscription state. For example, a subscription type may indicate a throttled subscriber, a premium subscriber, an unlimited subscriber or the like. For a throttled subscriber, a subscription state may indicate an under-usage subscriber, an over usage subscriber or the like, for example. Operation 222 may include an operation 224 for allocating the network resource for the subscriber or subscriber group based on the resources weights computed based on the throttle.

Figure 2B:
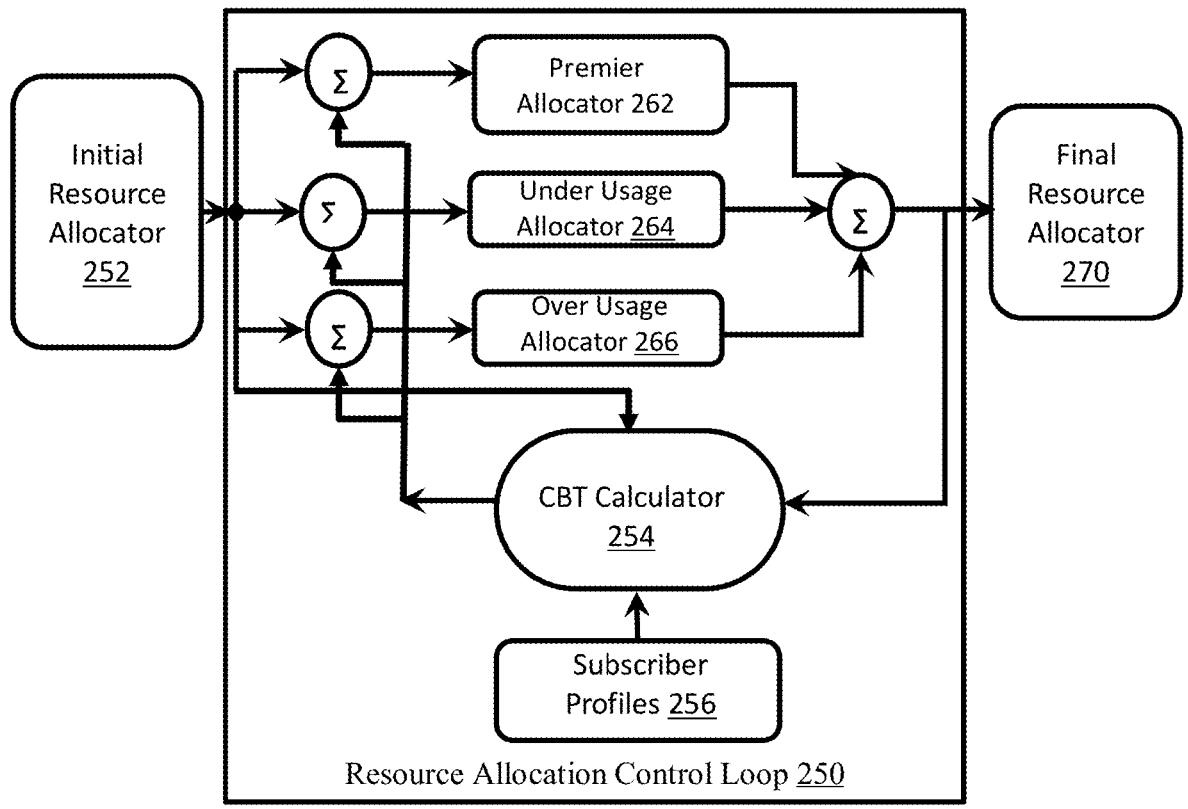
FIG. 2B illustrates an exemplary resource allocation system control loop including a congestion-based throttle according to various embodiments.

FIG. 2B illustrates an exemplary resource allocation system control loop including a congestion-based throttle according to various embodiments.

The method 200 may include an operation 230 for adjusting for underutilization of the network resource based on a feedback loop illustrated in FIG. 2B. Operation 230 may include an operation 232 for adjusting a throttle for a subscriber or subscriber group. Operation 230 may include an operation 234 for adjusting a resource weight for a subscriber or subscriber group. Operation 230 may include an operation 236 for detecting a change in the underutilization level. Without limitation, the change in the underutilization level may be result of allocating more of the network resource to over subscribers, a change in a current usage, a change in a current throughput of the network resource, a historical congestion behavior reflecting a more congested allocation interval being upcoming, or the like.

FIG. 2B illustrates an exemplary resource allocation system control loop including a congestion-based throttle according to various embodiments.

A resource allocation system control loop 250 may receive an initial allocation from an initial resource allocator 252 for a network resource. The initial allocation may be based, for example, on subscriber demand. The allocation by the initial resource allocator 252 may be adjusted with a CBT calculator 254 of the resource allocation system control loop 250. In some embodiments, the resource allocation system control loop 250 may implement the method 200 of FIG. 2A. The CBT calculator 254 may access a subscriber profile 256 to receive current usage, subscription type, subscription state or the like information for a subscriber or subscriber group. Based on the subscriber profile 256, the CBT calculator 254 may calculate a throttle and a resource weight. Allocation based on the throttles and resource weights from the CBT calculator 254 may be aggregated by a subscriber grouping as described above. Each subscriber grouping may implement allocators, for example, a premier allocator 262, an under-usage allocator 264, and an over usage allocator 266. The output of the allocators (premier allocator 262, under-usage allocator 264, over usage allocator 266) may be received a final resource allocator 270 and the CBT calculator. The final resource allocator 270 may allocate per a QoS, FAP, available bandwidth, or the like.

FIG. 3 illustrates a dynamic adjustment control transition diagram according to various embodiments.

A dynamic adjustment control transition may include a threshold change 300 as an operation or a module. The threshold change 300 may detect a change in the underutilization level in response to a method to reduce waste of a network resource, for example, the method 200 above. As the underutilization level of the network resource changes in view of allocating more of the network resource to the active subscribers, the threshold change may be detecting after a configurable interval to readjust utilization or congestion of the network resource.

In exemplary embodiments, operation 310 may define low utilization state as utilization of the network resource at less than 70%. At low utilization state, threshold change 300 may increase a speed associated with a group of throttled subscribers up to 32 Megabits per second (Mbps). Operation 312 may define high utilization state as utilization of the network resource at greater than 70% and less than 80%. At high utilization state, threshold change 300 may decrease the speed associated with a group of throttled subscribers up to 8 Mbps. Operation 314 may define peak utilization state as utilization of the network resource at greater than 80% and less than 90%. At peak utilization state, threshold change 300 may decrease the speed associated with a group of throttled subscribers up to 4 Mbps. Operation 316 may define near congestion state as utilization of the network resource at greater than 90% and less than 94%. At near congestion state, threshold change 300 will decrease the speed associated with a group of throttled subscribers up to 2 Mbps. Operation 318 may define congestion onset state as utilization of the network resource at greater than 94%. At congestion onset state, threshold change 300 will decrease the speed associated with a group of throttled subscribers to a lowest speed limit specified in a subscriber's profile.

In some embodiments, the threshold change 300 may be applied to subscribers under their usage allowance. The increase in speed applied by threshold change 300 for under subscribers may be added to a minimum or contracted speed, a speed per Quality of Service (QoS) demand, a speed provided by a Fair Access Policy (FAP), or the like.

Figure 4:
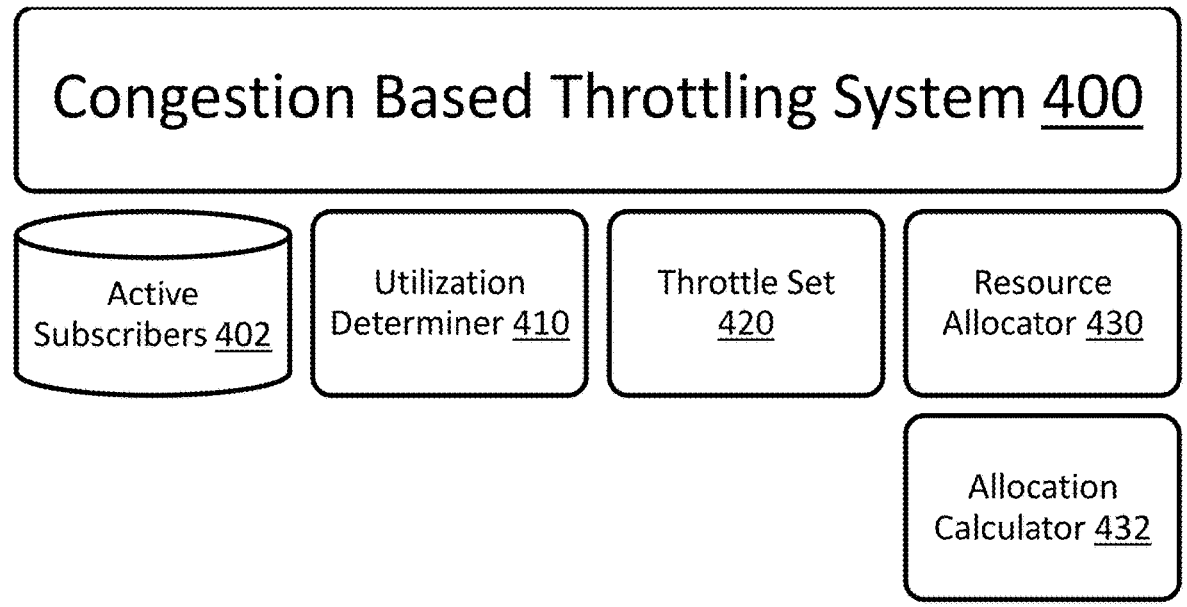
FIG. 4 illustrates an exemplary system to reduce waste of a network resource according to various embodiments.

FIG. 4 illustrates an exemplary system to reduce waste of a network resource according to various embodiments.

A congestion based throttling system 400 may include an active subscribers group 402. The active subscribers group 402 may group or classify active subscribers by a subscriber type and a subscriber state as discussed above. The congestion based throttling system 400 may include a utilization determiner 410. In some embodiments, the utilization determiner 410 may be implemented per operation 210 of FIG. 2A. The congestion based throttling system 400 may include a throttle set 420. In some embodiments, the throttle set 420 may be implemented per operation 230 of FIG. 2A. The congestion based throttling system 400 may include a resource allocator 430. In some embodiments, the resource allocator 430 may be implemented per operation 220 of FIG. 2A. The resource allocator 430 may include an allocation calculator to calculate a throttle and a resource weight per operation 222 of FIG. 2A.

The congestion based throttling system 400 may reduce wastage of satellite resources by giving more bandwidth to all active users, with preference to users who have positive data allowance credits.

Figure 5:
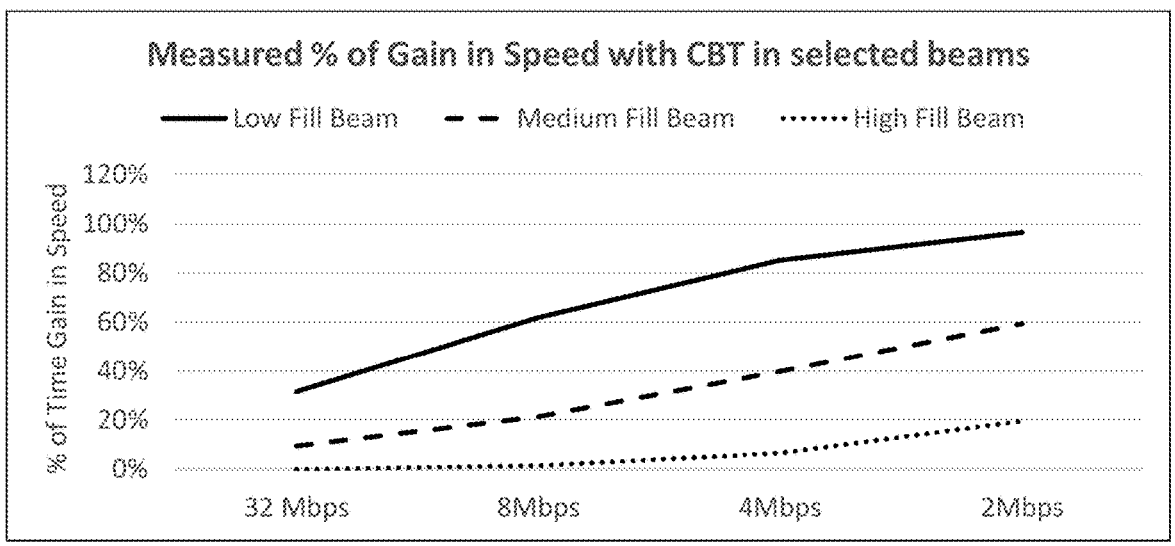
FIG. 5 illustrates a measured percentage of gain in speed for a system by implementing the present teachings according to various embodiments.

FIG. 5 illustrates a measured percentage of gain in speed for a system implementing the present teachings according to various embodiments.

With the present teachings, it was observed that 85% of time throttled users can get 10-20 times higher speeds of bandwidth without affecting the performance of unthrottled subscribers in a in low fill beam, and substantial improvements in speed in the beam during an underutilized or uncongested period, for example, a non-peak period.

FIG. 6 illustrates measured speed improvements for bandwidth of a network during underutilized or uncongested periods for subscribers according to various embodiments, FIG. 6 illustrates a chart 600 of bandwidth allocated to various subscribers on a satellite link. The chart 600 includes a network utilization measure 602 versus a measured speed 604 for the subscribers. Per chart 600, when the network utilization measure 602 is overutilized or congested, the measured speed 604 decreases. However, when the network utilization measure 602 is underutilized or uncongested, the measured speed 604 increases.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

The invention claimed is:

1. A method for reducing waste of a network resource, the method comprising:
   providing a group of active subscribers;
   determining an underutilization level of the network resource for an upcoming allocation interval;
   calculating a throttle and a resource weight for the group of active subscribers to decrease the underutilization level;
   allocating the network resource based on the throttle and the resource weight; and
   adjusting, based on a feedback underutilization level, the throttle and the resource weight.

2. The method of claim 1, wherein the group of active subscribers includes an over usage subscriber who has exceeded a network resource usage allowance for a subscription interval associated with the over usage subscriber, and the calculating comprises calculating the throttle and the resource weight for the over usage subscriber.

3. The method of claim 1, wherein the determining is based on a historical congestion behavior of the network resource.

4. The method of claim 1, wherein the determining is based on a current usage and a current throughput of the network resource.

5. The method of claim 1, wherein the network resource comprises a channel of a frequency and time multiplexed radio link relayed via a satellite or high-altitude platform.

6. The method of claim 1, wherein the throttle is based on congestion metrics comprising an available channel capacity, a latency, a queue depth, a count of subscribers in a outroute channel, or a combination thereof.

7. The method of claim 1, wherein the network resource comprises a data switching element, RF bandwidth, modulation techniques and subscriber multiplexing ratio, or a combination thereof.

8. The method of claim 1, wherein the adjusting comprises adjusting the throttle for each active subscriber in the group of active subscribers based on an associated subscription level, and the associated subscription level comprises a premium subscription level or a non-premium subscription level.

9. The method of claim 1, wherein each active subscriber in the group of active subscribers is associated with a profile group comprising one or more of a subscription state, a subscription level, an allowance usage state, a subscription throughput, and Quality of Service (QoS), and the adjusting is based on the profile group associated with a respective active subscriber.

10. The method of claim 1, wherein the adjusting provides an adjusted throttle and an adjusted resource weight for each active subscriber in the group of active subscribers based on a respective active subscriber's subscription type, and a premium subscription type is adjusted to provide a higher Quality of Service (QoS) as compared to a non-premium subscription type.

11. A Congestion Based Throttling (CBT) system to reduce waste of a network resource, the system comprising:
   a group of active subscribers;
   a utilization determiner to determine an underutilization level of the network resource for an upcoming allocation interval;
   an allocation calculator to calculate a throttle and a resource weight for the group of active subscribers to decrease the underutilization level;
   a resource allocator to allocate the network resource based on the throttle and the resource weight; and
   a throttle set to adjust, based on a feedback underutilization level, the throttle and the resource weight.

12. The CBT system of claim 11, wherein the group of active subscribers includes an over usage subscriber who has exceeded a network resource usage allowance for a subscription interval associated with the over usage subscriber, and the allocation calculator further calculates the throttle and the resource weight for the over usage subscriber.

13. The CBT system of claim 11, wherein the utilization determiner is based on a historical congestion behavior of the network resource.

14. The CBT system of claim 11, wherein the utilization determiner is based on a current usage and a current throughput of the network resource.

15. The CBT system of claim 11, wherein the network resource comprises a channel of a frequency and time multiplexed radio link relayed via a satellite or high-altitude platform.

16. The CBT system of claim 11, wherein the throttle is based on congestion metrics comprising an available channel capacity, a latency, a queue depth, a count of subscribers in a outroute channel, or a combination thereof.

17. The CBT system of claim 11, wherein the network resource comprises a data switching element, RF bandwidth, modulation techniques and subscriber multiplexing ratio, or a combination thereof.

18. The CBT system of claim 11, wherein the throttle set adjusts the throttle for each active subscriber in the group of active subscribers based on an associated subscription level, and the associated subscription level comprises a premium subscription level or a non-premium subscription level.

19. The CBT system of claim 11, wherein each active subscriber in the group of active subscribers is associated with a profile group comprising one or more of a subscription state, a subscription level, an allowance usage state, a subscription throughput, and Quality of Service (QoS), and the throttle set adjusts based on the profile group associated with a respective active subscriber.

20. The CBT system of claim 11, wherein the throttle set provides an adjusted throttle and an adjusted resource weight for each active subscriber in the group of active subscribers based on a respective active subscriber's subscription type, and a premium subscription type is adjusted to provide a higher Quality of Service (QoS) as compared to a non-premium subscription type.

* * * * *